(12) United States Patent
Baltus

(10) Patent No.: US 10,561,980 B2
(45) Date of Patent: Feb. 18, 2020

(54) METHOD AND DEVICE FOR COOL DRYING A GAS

(75) Inventor: Frits Cornelis A. Baltus, Schelle (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 1619 days.

(21) Appl. No.: 13/580,529

(22) PCT Filed: Feb. 21, 2011

(86) PCT No.: PCT/BE2011/000008
§ 371 (c)(1),
(2), (4) Date: Aug. 22, 2012

(87) PCT Pub. No.: WO2011/116434
PCT Pub. Date: Sep. 29, 2011

(65) Prior Publication Data
US 2012/0312051 A1    Dec. 13, 2012

(30) Foreign Application Priority Data
Feb. 24, 2010    (BE) .................................. 2010/0122

(51) Int. Cl.
*B01D 53/26*    (2006.01)
(52) U.S. Cl.
CPC .................................. *B01D 53/265* (2013.01)
(58) Field of Classification Search
CPC .................. B01D 53/265; F24F 3/1405; F24F 2003/1446
See application file for complete search history.

(56) References Cited

U.S. PATENT DOCUMENTS 4,482,007 A * 11/1984 Yoshimi ............... B60H 1/3207
                                                165/225
5,632,333 A *  5/1997 Imamura ............... B01D 53/265
                                                165/228
(Continued)

FOREIGN PATENT DOCUMENTS

EP    1103296 A1 *  5/2001    ........... B01D 5/0039
WO    9961135 A1   12/1999
(Continued)

OTHER PUBLICATIONS

International Search Report for PCT/BE2011/000008, dated Jun. 8, 2011.

*Primary Examiner* — Ljiljana V. Ciric
*Assistant Examiner* — Alexis K Cox
(74) *Attorney, Agent, or Firm* — Bacon & Thomas, PLLC

(57) ABSTRACT

A method for cool drying gas having the steps of determining the evaporator temperature and/or evaporator pressure and measuring the lowest gas temperature. The method includes the step of determining the load of the cooling circuit on the basis of the evaporator temperature and/or evaporator pressure and the lowest gas temperature and calculating a desired value for the evaporator temperature and/or evaporator pressure that is required to cool the gas supplied to a set lowest gas temperature which includes the load. The speed of the compressor is then controlled to make the evaporator temperature and/or evaporator pressure equal to the desired value.

10 Claims, 4 Drawing Sheets

(56) References Cited

U.S. PATENT DOCUMENTS

| | | | |
|---|---|---|---|
| 5,746,061 A * | 5/1998 | Kramer | B01D 53/265 |
| | | | 374/39 |
| 6,393,850 B1 | 5/2002 | Vanderstraeten | |
| 6,460,359 B1 | 10/2002 | Lauwers | |
| 2009/0025407 A1 * | 1/2009 | Dalla Valle | B01D 53/265 |
| | | | 62/129 |
| 2009/0229279 A1 | 9/2009 | Dalla Valle et al. | |
| 2009/0320505 A1 | 12/2009 | Van Dijck et al. | |
| 2010/0279181 A1 * | 11/2010 | Adams, II | B01D 53/265 |
| | | | 429/410 |
| 2013/0125567 A1 * | 5/2013 | Baltus | B01D 53/265 |
| | | | 62/93 |
| 2015/0168038 A1 * | 6/2015 | Baltus | B01D 53/265 |
| | | | 62/115 |

FOREIGN PATENT DOCUMENTS

| | | |
|---|---|---|
| WO | 2006133522 A1 | 12/2006 |
| WO | 2007022604 A1 | 3/2007 |
| WO | 2008055322 A1 | 5/2008 |

* cited by examiner

METHOD AND DEVICE FOR COOL DRYING A GAS

BACKGROUND OF THE INVENTION

A. Field Of The Invention

The present invention relates to a method for cool drying gas.

B. Related Art

More specifically, the invention relates to a method for cool drying gas in which water vapour is condensed from the gas by guiding the gas through the secondary part of a heat exchanger, the primary part of which forms the evaporator of a cooling circuit, which cooling circuit comprises a speed-controlled compressor for the circulation of a coolant in the cooling circuit, as well as a condenser and expansion means, whereby means are applied to determine the evaporator temperature $T_{evaporator}$ and/or evaporator pressure $p_{evaporator}$ and means for measuring the lowest gas temperature (LAT).

As is known, cool drying is based on the principle that the moisture condenses out of the gas by lowering the gas temperature, after which the condensed water is separated in a liquid separator, and after which the gas is again heated such that this gas is no longer saturated.

Compressed air supplied by a compressor, for example, is in most cases saturated with water vapour, or in other words has a relative humidity of 100%. This means that condensation occurs in the event of a temperature drop to below the so-called dew point. As a result of the condensed water, corrosion will occur in pipes and tools and the equipment can present premature wear.

That is why compressed air is dried, which can be done in the aforementioned way by cool drying. Other gases can also be dried in this way.

When drying compressed air, the air in the heat exchanger must not be cooled by too much as otherwise the condensate could freeze. Typically the dried compressed air has a temperature equal to 20 degrees Celsius below ambient temperature, but never less than two to three degrees Celsius above zero. To this end, the temperature of the coolant in the evaporator is kept between 15° C. and −5° C.

In order to prevent freezing of the condensate, as is known the speed of the compressor is controlled as a function of the measured lowest gas temperature LAT. The LAT is the lowest occurring temperature of the gas to be dried that is guided through the secondary part of the aforementioned heat exchanger.

If the LAT decreases and the condensate threatens to freeze, for example due to a lowering of the gas flow supplied, the speed of the compressor is reduced such that the LAT increases again. The freezing of the condensate is thus avoided.

If the LAT increases, for example due to a rise of the gas flow supplied, the speed of the compressor is increased such that the evaporator temperature falls and the LAT also falls.

A disadvantage of a control based on the LAT is that the evaporator temperature can become too low, such that freezing can occur in the evaporator.

A control based on the evaporator pressure, in other words the pressure in the evaporator, is also known. In such a case the speed of the compressor is controlled such that the evaporator pressure is maintained between certain limits.

A disadvantage of the aforementioned control is that at a low load of the cooling circuit, or for example at a low flow of gas supplied, the condensate can freeze.

SUMMARY OF THE INVENTION

The purpose of the present invention is to provide a solution to one or more of the aforementioned disadvantages and/or other disadvantages by providing a method for cool drying gas in which water vapour is condensed out of the gas by guiding the gas through the secondary part of a heat exchanger, the primary part of which forms the evaporator of a cooling circuit, which cooling circuit comprises a speed-controlled compressor for circulating a coolant in the cooling circuit, as well as a condenser and expansion means, whereby means are applied to determine the evaporator temperature $T_{evaporator}$ and/or evaporator pressure $p_{evaporator}$ and means for measuring the lowest gas temperature (LAT) or the dew point, whereby the method comprises the following steps during cool drying:

- determining the load of the cooling circuit on the basis of the evaporator temperature $T_{evaporator}$ and/or evaporator pressure $p_{evaporator}$ on the one hand, and the lowest gas temperature (LAT) on the other;
- calculating a desired value for the evaporator temperature or evaporator pressure that is required to cool the gas supplied to a set lowest gas temperature (LATSP) at the outlet of the secondary part of the heat exchanger, taking the aforementioned load into account; and
- controlling the compressor speed to make the evaporator temperature or evaporator pressure equal to or practically equal to the aforementioned desired value for the evaporator temperature or evaporator pressure.

A method according to the invention calculates a desired value for the evaporator temperature or evaporator pressure that is required to cool the gas supplied at a certain flow rate to a set lowest gas temperature (LATSP).

If a parameter in the aforementioned flow (quantity, humidity, pressure, temperature, . . . ) changes, then in a method according to the invention, the calculated desired value also changes for the evaporator temperature or evaporator pressure that is needed to cool the changed flow rate of gas supplied to the lowest set gas temperature (LATSP).

In this way, independently of the load of the cooling circuit, the gas is cooled to a set lowest gas temperature (LATSP) such that the condensate cannot freeze.

The foregoing also implies that no energy is consumed unnecessarily, as the evaporator temperature or evaporator pressure is not kept lower than is strictly required.

Indeed, it is clear that at a certain set lowest gas temperature (LATSP), the desired value of the evaporator temperature or the desired value of the evaporator pressure increases as the cooling circuit is loaded less, or otherwise as the flow of gas supplied decreases. In this way a method according to the invention uses a minimum of energy to cool a certain gas flow rate to a set lowest gas temperature (LATSP).

Another advantage of a method according to the invention is that the load of the cooling circuit is determined on the basis of only two measurements, preferably of the lowest gas temperature (LAT) and of the evaporator pressure $p_{evaporator}$. External data such as flow rate, temperature, pressure, relative humidity, free water and such are not required to adapt the cooling circuit to the load.

According to a preferred characteristic of the invention, the cooling circuit always operates at an evaporator temperature that is higher than a minimum permissible evaporator temperature.

An advantage of this is that no freezing can occur in the evaporator under any circumstances, as the evaporator temperature can not be less than a minimum allowable value.

It is known that there is an unequivocal link between the temperature and pressure at a certain point of the evaporator, and consequently instead of a control based on the evaporator temperature, a control based on the evaporator pressure is possible.

The invention also relates to a device for cool drying a gas, which device comprises a heat exchanger of which the primary part forms the evaporator of a cooling circuit in which there are provided successively a speed-controlled compressor, a condenser and expansion means, and whereby the aforementioned heat exchanger has a secondary part to which a pipe is connected for supplying a gas to be dried, and whereby downstream from this secondary part of the aforementioned heat exchanger is provided a liquid separator for removing condensate, whereby the aforementioned device has means for measuring the evaporator pressure $p_{evaporator}$ and the lowest gas temperature (LAT), and which means are connected to a control unit that is also connected to the aforementioned compressor to control its rotational speed on the basis of measurements of the lowest gas temperature and the evaporator pressure ($p_{evaporator}$).

The advantages of such a device according to the invention are similar to the advantages linked to a method according to the invention.

According to a preferred embodiment of a device according to the invention, the aforementioned control unit has an algorithm that determines the load of the cooling circuit on the basis of the aforementioned lowest gas temperature (LAT) and the measured evaporator pressure $p_{evaporator}$; and which, taking the aforementioned load into account, calculates a desired value ($p_w$) for the evaporator pressure that is required to cool the gas supplied to a set lowest gas temperature (LATSP) at the output of the secondary part of the heat exchanger; and which controls the speed of the compressor such that the evaporator pressure $p_{evaporator}$ is equal or practically equal to the aforementioned desired value ($p_w$) of the evaporator pressure.

DESCRIPTION OF THE DRAWINGS

With the intention of better showing the characteristics of the invention, a method according to the invention for cool drying a gas is described hereinafter by way of an example, without any limiting nature, with reference to the accompanying drawings, wherein.

DETAILED DESCRIPTION

Figure 1:
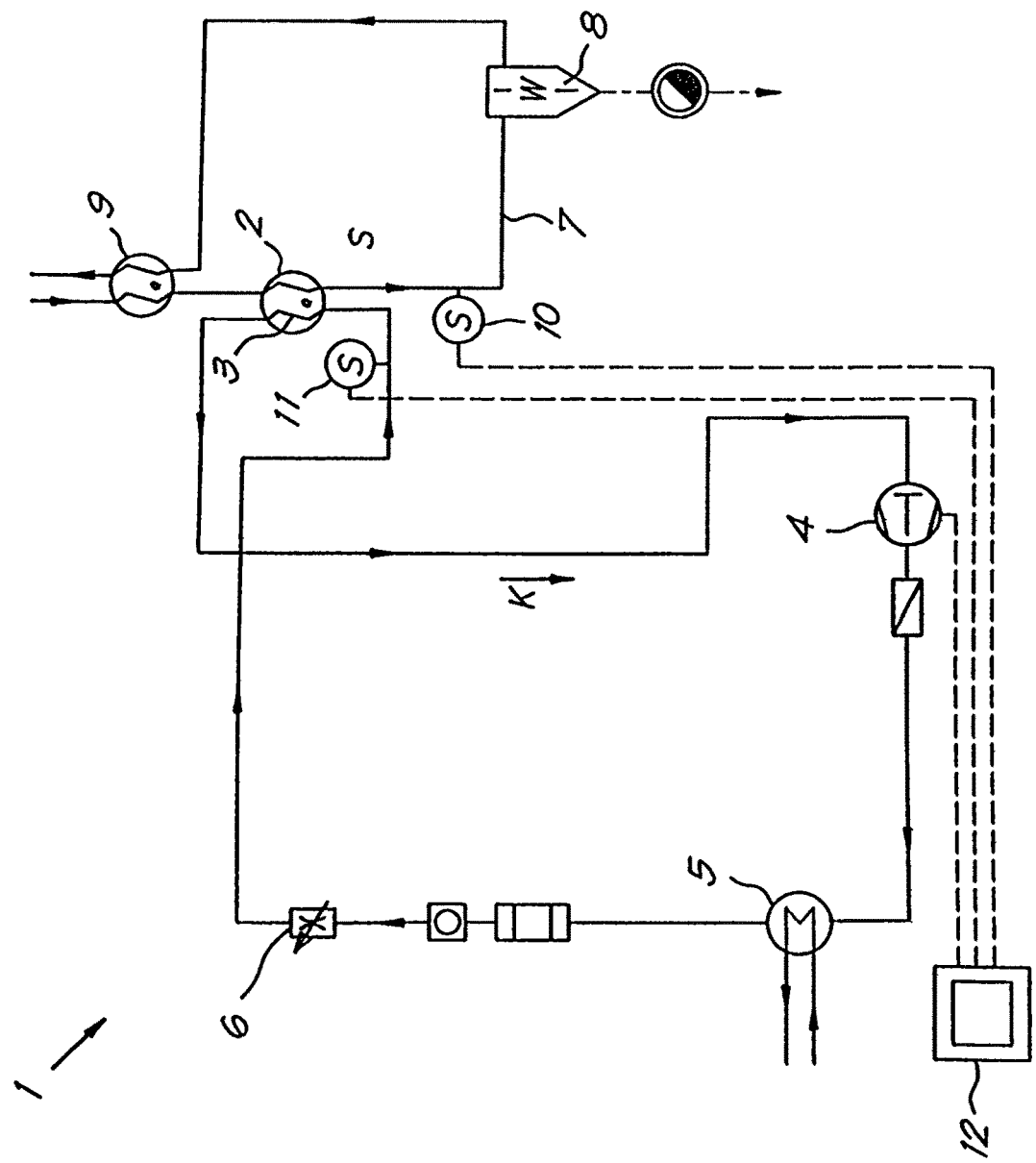
FIG. 1 shows a block diagram of a device that can be used in a method according to the invention for cool drying gas.

The device 1 for cool drying, that is schematically shown in FIG. 1, contains a heat exchanger 2 the primary part of which forms the evaporator 3 of a cooling circuit in which there are successively also a compressor 4, a condenser 5 and expansion means 6.

The cooling circuit is filled with a coolant, for example R404a, of which the flow direction is indicated by the arrow K.

The secondary part of the heat exchanger 2 is connected to a liquid separator 8 via a pipe 7.

A part of this pipe 7 may, before it reaches the heat exchanger 2, extend partly through a pre-cooler or recuperating heat exchanger 9 and then, after the liquid separator 8, extend again through the recuperating heat exchanger 9, flowing in countercurrent to the aforementioned part.

Furthermore, the device 1 is provided with means for measuring the lowest gas temperature (LAT), and in this case these means are constructed in the form of a first measuring element 10 that is positioned at the level of the secondary part of the heat exchanger 2. The device 1 also contains means for determining the evaporator temperature $T_{evaporator}$ and/or evaporator pressure $p_{evaporator}$, in this case in the form of a second measuring element 11 that is placed in the low-pressure side of the cooling circuit to measure the evaporator pressure $p_{evaporator}$.

In other words the second measuring element 11 is placed downstream from the aforementioned expansion means 6 and just upstream from the aforementioned evaporator.

The compressor 4 is connected to a control unit 12 to which the first and second measuring elements 10 and 11 are also connected.

The method according to the invention is very simple and as follows.

The gas or mixture of gases to be dried, in this case compressed air, is guided through the secondary part of the heat exchanger 2, preferably flowing in the direction opposite to the coolant in the evaporator 3 of the cooling circuit.

In the aforementioned heat exchanger 2, the moist air supplied is cooled, whereby condensate is formed that is then separated in the liquid separator 8.

The cold air, which contains less moisture after this liquid separator 8 but nonetheless has a relative humidity of 100%, is heated in the recuperation heat exchanger 9 such that the relative humidity falls to 50% for example, while the supplied air to be dried is already partially cooled in this recuperation heat exchanger 9 before being guided to the heat exchanger 2.

The air at the output of the secondary part of the heat exchanger 2 is thus drier than at the input of the secondary part of the heat exchanger 2.

In order to avoid condensate freezing, the compressed air supplied may not be cooled to less than 2 to 3° C. in the heat exchanger 2.

A method according to the invention cools the compressed air supplied to a set lowest gas temperature LATSP by calculating a desired value $T_w$ or $p_w$ for the evaporator temperature or evaporator pressure, and by controlling the rotational speed n of the compressor 4 such that the evaporator temperature $T_{evaporator}$ or evaporator pressure $p_{evaporator}$ is equal to or practically equal to the aforementioned calculated desired value of the evaporator temperature $T_w$ or the evaporator pressure $p_w$.

The higher the set lowest gas temperature LATSP, the higher is the corresponding calculated desired value. When cool drying compressed air, the lowest gas temperature LATSP is typically set to a value that is 20° C. below the ambient temperature, preferably with the restriction that the lowest gas temperature LATSP cannot be set to less than 2 to 3° C.

It is essential hereby that a method according to the invention calculates the aforementioned desired value for the temperature $T_w$ or pressure $p_w$ in the evaporator 3, taking the load C of the cooling circuit into account.

The load C of the cooling circuit is determined on the basis of the measured values of the lowest gas temperature (LAT) on the one hand, and the evaporator pressure $p_{evaporator}$ and/or evaporator temperature $T_{evaporator}$ on the other. In this case, on the basis of the lowest gas temperature (LAT) and evaporator pressure $p_{evaporator}$, measured respectively by the first and the second measuring element 10 and 11.

As already mentioned the desired value $p_w$ rises to the extent that the lowest gas temperature LATSP is set higher. In this case a linear relationship is assumed between the lowest gas temperature and the evaporator pressure. The slope of the aforementioned linear relationship depends on the type of cooler and is mathematically characterised by a gradient R.

When, as is the case in this example, the evaporator pressure ($p_{evaporator}$) is measured, the load is determined by calculating a value C according to the formula:

$$C=[D1*Ln(p_{evaporator})-D2]-[R*LAT]+A-B$$

where the values D1 and D2 are constants that depend on the coolant used in the cooling circuit.

The value A is the dew point that is reached at a minimum allowable evaporator temperature or pressure B.

At a constant evaporator temperature $T_{evaporator}$, the value C rises to the extent that the load falls. Indeed, upon a decrease of the flow rate of compressed air supplied, the LAT drops such that C increases. The reverse applies with an increase of the load such that the LAT rises and C drops.

In this example the dew point A of 3° C. is reached at a minimum allowable evaporator temperature of −5° C.

After the load has been determined by calculating the value C, a desired value $T_w$ for the evaporator temperature can be calculated, and derived from this for the evaporator pressure $p_w$, and this desired value $T_w$ for the evaporator temperature is calculated on the basis of the set lowest gas temperature LATSP with the following formula:

$$T_w=R*LATSP-A+B+C.$$

The foregoing formula applies if the measured lowest gas temperature (LAT) is higher than A or in this case higher than 3° C.

In all other cases a desired value $T_w$ for the evaporator temperature is calculated according to the formula:

$$T_w=B/A*LATSP.$$

According to a preferred characteristic of the invention, the cooling circuit always operates at an evaporator temperature $T_{evaporator}$ higher than B, or in this case higher than −5° C.

Figure 2:
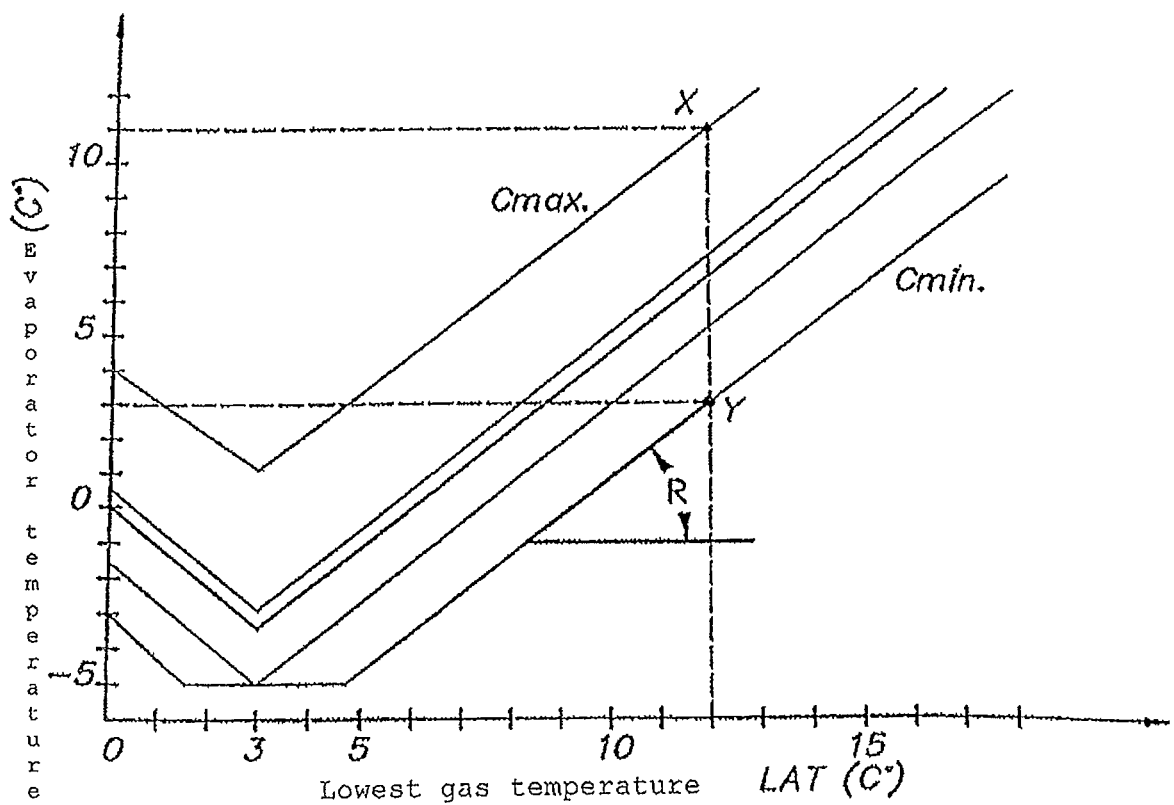
FIG. 2 shows desired values for the evaporator temperature and evaporator pressure in order to cool a certain flow of gas supplied to a set lowest gas temperature (LATSP) that are calculated with a method according to the invention.

The foregoing formulae are graphically presented in FIG. 2, which shows a number of curves that in this case show the relationship between the lowest gas temperature LAT and the evaporator temperature $T_{evaporator}$.

The top curve corresponds to the lowest possible load of the cooling circuit, or in other words with a maximum value (Cmax) of C. The bottom curve is used if the load is a maximum and corresponds to a minimum C value (Cmin).

The curves located between the top and bottom curve are calculated for a load that varies between the minimum and maximum load of the cooling circuit.

Given the relationship between temperature and pressure in the evaporator at a certain point, a desired value $p_w$ for the evaporator pressure can be derived from a calculated desired value $T_w$ for the evaporator temperature. The formula below can be used to determine the desired value $p_w$ of the evaporator pressure on the basis of the desired value $T_w$ of the evaporator temperature:

$$p_w=D3*e^{(D4*T_w)}$$

where D3 and D4 are constants whose values depend on the coolant.

Typically a value is given to the aforementioned constants D1, D2, D3 and D4 that is determined from the pressure/temperature curves for the coolant, as shown in the table below, but it goes without saying that the invention is not restricted as such:

|  | D1 | D2 | D3 | D4 |
|---|---|---|---|---|
| R404a | 27.462 | 43.793 | 4.9288 | 0.0363 |
| R410a | 28.658 | 55.216 | 6.869 | 0.0348 |

The values in the first row of this example apply if R404a is used as a coolant, while the second row contains example values for the constants D1 to D4 if R410a is used as a coolant.

Consequently the control unit 12 of the compressor 4 controls the speed of the compressor on the basis of a desired value for the evaporator pressure.

FIG. 2 indicates that the desired value $T_w$ for the evaporator temperature, which is required to cool the gas supplied to a set lowest gas temperature LATSP, changes as a function of the load. The same applies to the desired value $p_w$ for the evaporator pressure.

As can be read from the coordinates of point X on the top curve, at a minimum load of the cooling circuit a desired value $T_w$ of 11° C. is calculated for the evaporator temperature in order to cool the gas supplied to a set lowest gas temperature LATSP of 12° C.

On the other hand at a maximum load of the cooling circuit, a desired value $T_w$ of 3° C. is calculated for the evaporator temperature in order to cool the gas supplied in this case to a set lowest gas temperature LATSP of 12° C., as can be read from the coordinates of the point Y located on the bottom curve.

The minimum allowable evaporator temperature B in this case is set equal to −5° C. The bottom curve in FIG. 2 is consequently limited at the bottom such that a desired value $T_w$ of less than −5° C. for the evaporator temperature cannot be calculated under any circumstances.

In this way freezing in the heat exchanger is avoided.

If the evaporator temperature $T_{evaporator}$ is measured, which is not ruled out according to the invention, the load is determined according to the formula:

$$C=T_{evaporator}-[R*LAT]+A-B$$

where

LAT=the measured lowest gas temperature.

A=the dew point that is reached at a minimum allowable evaporator temperature B.

R=the gradient that characterises the linear relationship between the lowest gas temperature LAT and the evaporator temperature $T_{evaporator}$ for a measured lowest gas temperature greater than A.

The load reflected by the value C is preferably calculated with a time interval TC. After the time interval TC, a snapshot of the average temperature is taken. Average temperature here means the average temperature in the heat exchanger 2, whereby this heat exchanger 2 can be constructed from one or more partial heat exchangers connected in parallel and/or series.

The value obtained for C during a time interval TC is then used for a time interval TC to control the cooling circuit and thus the dryer. After expiry of the time interval TC, the value C is calculated again, and then a new evaporator pressure set point follows, or otherwise.

The smaller the time interval TC, the faster the response to a varying load.

Figure 3:
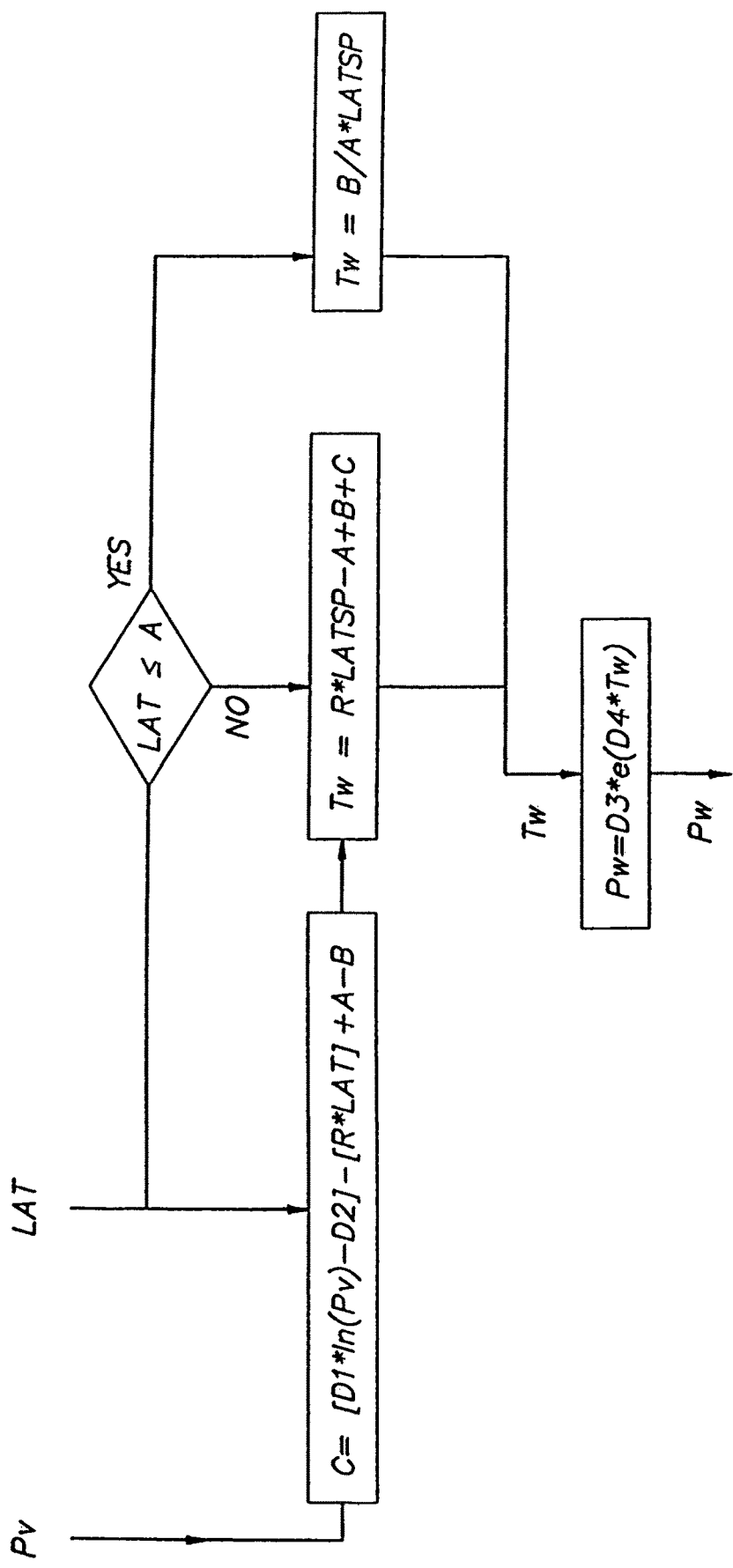
FIG. 3 shows a block diagram of a control algorithm for determining a desired value for the evaporator pressure ($p_w$)

FIG. 3 shows the algorithm that is used by the control unit 12 in this case to determine a desired value $p_w$ for the evaporator pressure, whereby the algorithm takes the load of the cooling circuit into account. In this case, the load is determined on the basis of the measured evaporator pressure, shown in FIG. 3 by $p_v$, and the measured lowest gas temperature LAT.

Figure 4:
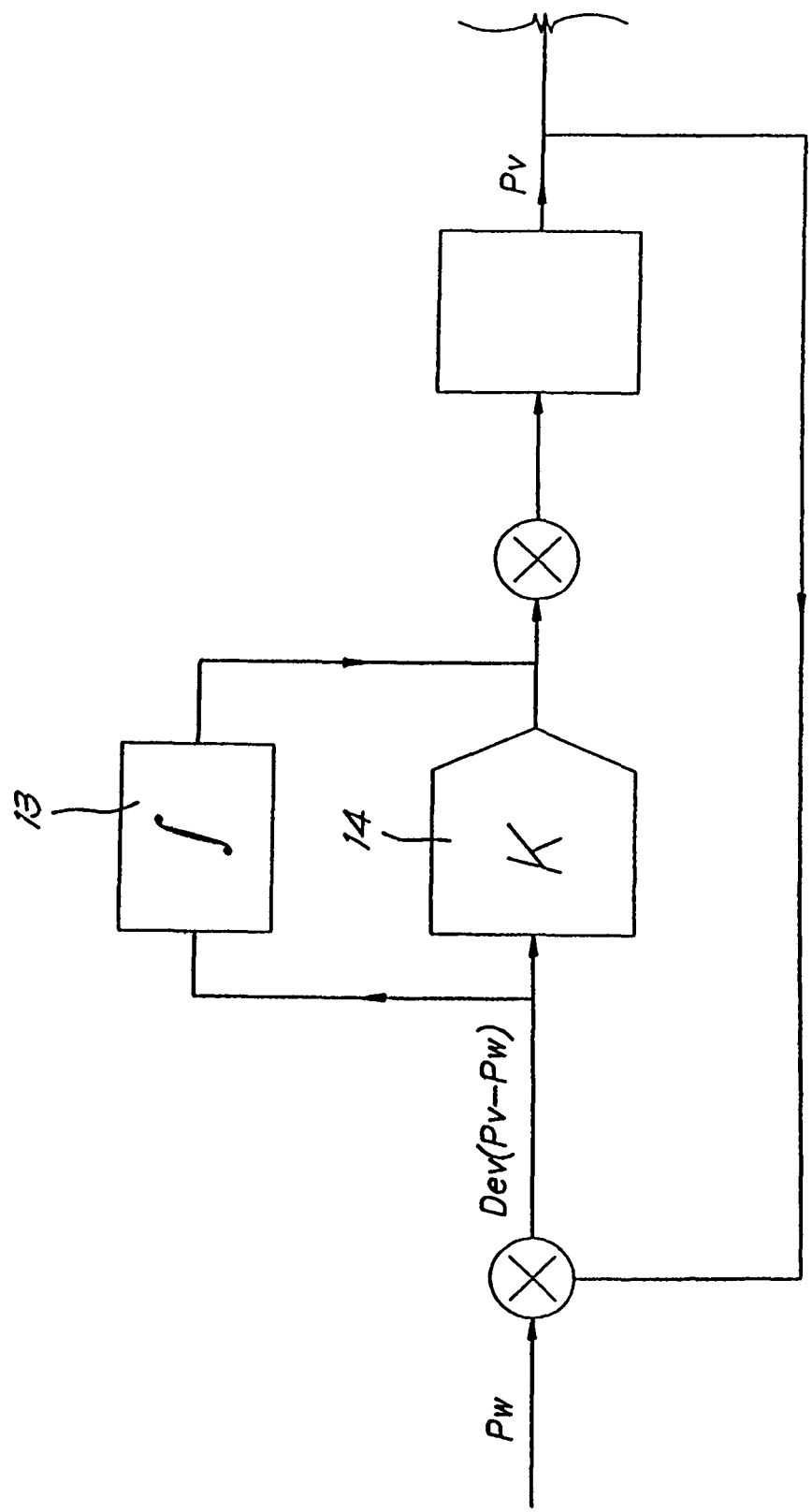
FIG. 4 shows a control diagram for controlling the compressor speed.

FIG. 4 shows the control diagram, which in this case is used by the control unit 12 to control the rotational speed n of the compressor 4 after a certain desired value $p_w$ has been calculated for the evaporator pressure.

The control diagram compares the desired value $p_w$ for the evaporator pressure, calculated according to FIG. 3, to the measured value of the evaporator pressure $p_v$. The control algorithm then continues with the difference between the evaporator pressure $p_v$ and the desired value $p_w$. The aforementioned difference is integrated by an integrator 13 and/or amplified by an amplifier 14.

Then the control unit 12 controls the rotational speed n of the compressor 4 as a function of the difference between the aforementioned desired value $p_w$ and the measured value of the evaporator pressure $p_v$.

The present invention is by no means limited to the method for cool drying gas and a device for applying such a method, described as an example and shown in the drawing, but such a method and device can be realised in all kinds of variants, without departing from the scope of the invention.

The invention claimed is:

1. A method for cool drying compressed gas in which water vapour is condensed out of the compressed gas by guiding the compressed gas through a secondary part of a heat exchanger, wherein a primary part of said heat exchanger comprises an evaporator of a cooling circuit, said cooling circuit comprising a speed-controlled compressor for circulating a coolant in the cooling circuit, a condenser and expansion device, wherein at least one measurement is made to determine at least one of the evaporator temperature $T_{evaporator}$ and the evaporator pressure $p_{evaporator}$, and wherein a measurement is made to determine the lowest gas temperature (LAT) or the dew point, the method comprising the steps:

determining the load of the cooling circuit on the basis of the at least one measurement which has been made to determine at least one of evaporator temperature $T_{evaporator}$ and the evaporator pressure $p_{evaporator}$, and the lowest gas temperature (LAT);

using a control unit to calculate a desired value for the evaporator temperature or evaporator pressure that is required to cool the compressed gas supplied to a set lowest gas temperature (LATSP) at an outlet of the secondary part of the heat exchanger, wherein the calculating the desired value includes the load and a detected change in a parameter of a flow of the compressed gas; and using the control unit to control the speed of the compressor to adjust the measured evaporator temperature or evaporator pressure to the desired value for the evaporator temperature or evaporator pressure to cool the compressed gas to the set lowest gas temperature, wherein the controlling the speed of the compressor comprises the step of comparing the desired value for the evaporator temperature or evaporator pressure to the respective measured evaporator temperature $T_{evaporator}$ or the evaporator pressure $p_{evaporator}$.

2. The method according to claim 1, wherein when the at least one measurement is made to determine the at least one of the evaporator temperature $T_{evaporator}$ and the evaporator pressure $p_{evaporator}$, the evaporator pressure $p_{evaporator}$ is measured, and the load C of the cooling circuit is determined according to the following formula:

$$C = [D1*Ln(p_{evaporator}) - D2] - [R*LAT] + A - B$$

where

LAT = the measured lowest gas temperature;

A = the dew point that is reached at a minimum allowable evaporator temperature B;

R = the gradient that characterizes the linear relationship between the lowest gas temperature and the evaporator temperature when the measured lowest gas temperature has a higher value than A;

D1 and D2 = constants whose value depends on the coolant.

3. The method according to claim 1, wherein when the at least one measurement is made to determine the at least one of the evaporator temperature $T_{evaporator}$ and the evaporator pressure $p_{evaporator}$, the evaporator temperature $T_{evaporator}$ is measured, and the load C is calculated according to the formula:

$$C = T_{evaporator} - [R*LAT] + A - B$$

where

LAT = the measured lowest gas temperature;

A = the dew point that is reached at a minimum allowable evaporator temperature B;

R = the gradient that characterises the linear relationship between the lowest gas temperature and the evaporator temperature for a measured lowest gas temperature greater than A.

4. The method according to claim 2, wherein after an initial time interval TC, the value C that reflects the load is calculated and after expiry of the time interval TC, the value C of the load is calculated again.

5. A method for cool drying compressed gas in which water vapour is condensed out of the compressed gas by guiding the compressed gas through a secondary part of a heat exchanger, wherein a primary part of said heat exchanger comprises an evaporator of a cooling circuit, said cooling circuit comprising a speed-controlled compressor for circulating a coolant in the cooling circuit, a condenser and expansion device, wherein at least one measurement is made to determine at least one of the evaporator temperature $T_{evaporator}$ and the evaporator pressure $p_{evaporator}$, and wherein a measurement is made to determine the lowest gas temperature (LAT) or the dew point, the method comprising the steps:

determining the load of the cooling circuit on the basis of the at least one measurement which has been made to determine at least one of evaporator temperature $T_{evaporator}$ and the evaporator pressure $p_{evaporator}$, and the lowest gas temperature (LAT);

using a control unit to calculate a desired value for the evaporator temperature or evaporator pressure that is required to cool the compressed gas supplied to a set lowest gas temperature (LATSP) at an outlet of the secondary part of the heat exchanger, wherein the calculating the desired value includes the load and a detected change in a parameter of a flow of the compressed gas; and using the control unit to control the speed of the compressor to adjust the measured evaporator temperature or evaporator pressure to the desired value for the evaporator temperature or evaporator pressure to cool the compressed gas to the set lowest gas temperature, wherein the controlling the speed of the compressor comprises the step of comparing the desired value for the evaporator temperature or evaporator pressure to the respective measured evaporator temperature $T_{evaporator}$ or the evaporator pressure $p_{evaporator}$, and wherein during the measurement of the LAT, if the measured LAT is less than or equal to A, a desired value ($T_w$) for the evaporator temperature to cool the gas to a set lowest gas temperature (LATSP) is calculated according to the formula:

$$T_w = B/A * LATSP$$

where

A = a dew point that is reached at a minimum allowable evaporator temperature B.

6. The method according to claim 2, wherein during the measurement of the LAT, if the measured LAT is greater than or equal to A, a desired value ($T_w$) for the evaporator temperature to cool the compressed gas to a set lowest gas temperature (LATSP) is determined according to the formula:

$$T_w = R*LATSP - A + B + C.$$

7. The method according to claim 5, wherein the desired value ($p_w$) for the evaporator pressure to cool the compressed gas to a set lowest gas temperature (LATSP) is calculated, on the basis of the calculated desired value for the evaporator temperature ($T_w$) according to the formula:

$$p_w = D3 * * e^{(D4*Tw)}$$

in which D3 and D4 represent constants with a value that depends on the coolant.

8. The method according to claim 1, further comprising the step of using the control unit to control the temperature of the cooling circuit to an evaporator temperature greater than a minimum allowable evaporator temperature B.

9. The method according to claim 2, further comprising the step of maintaining the dew point A at 3° C. and the lowest permissible evaporator temperature B at −5° C. when cool drying the compressed gas when controlling the speed of the compressor.

10. A method for cool drying compressed gas in which water vapour is condensed out of the compressed gas by guiding the compressed gas through a secondary part of a heat exchanger, wherein a primary part of said heat exchanger comprises an evaporator of a cooling circuit, said cooling circuit comprising a speed-controlled compressor for circulating a coolant in the cooling circuit, a condenser and expansion device, comprising the steps:

measuring an evaporator pressure ($p_{evaporator}$) and a lowest gas temperature (LAT);

determining a load of the cooling circuit on the basis of the measured evaporator pressure ($p_{evaporator}$) and the lowest gas temperature (LAT);

using a control unit to calculate a desired value ($p_w$) for the evaporator pressure that is required to cool the supplied compressed gas to a set lowest gas temperature (LATSP) at an output of the secondary part of the heat exchanger, wherein the calculating the desired value for the evaporator pressure includes the load and a detected change in a parameter of a flow of the compressed gas;

using the control unit to control a speed of the compressor to adjust the evaporator pressure ($p_{evaporator}$) to the desired value ($p_w$) for the evaporator pressure, wherein the controlling the speed of the compressor comprises the step of comparing the desired value for the evaporator pressure to the measured evaporator pressure $p_{evaporator}$.

* * * * *